(12) United States Patent
Li et al.

(10) Patent No.: US 12,320,942 B2
(45) Date of Patent: Jun. 3, 2025

(54) SENSOR MODULE, SENSOR ASSEMBLY AND ACOUSTIC LOGGING TOOL

(71) Applicants: CHINA NATIONAL OFFSHORE OIL CORPORATION, Beijing (CN); CHINA OILFIELD SERVICES LIMITED, Tianjin (CN)

(72) Inventors: Jie Li, Hebei (CN); Xien Liu, Hebei (CN); Zhifeng Sun, Hebei (CN); Ao Qiu, Hebei (CN); Yong Zhang, Hebei (CN); Kaixuan Peng, Hebei (CN)

(73) Assignees: CHINA NATIONAL OFFSHORE OIL CORPORATION, Beijing (CN); CHINA OILFIELD SERVICES LIMITED, Tianjin (CN)

(*) Notice: Subject to any disclaimer, the term of this patent is extended or adjusted under 35 U.S.C. 154(b) by 294 days.

(21) Appl. No.: 17/925,379

(22) PCT Filed: May 7, 2021

(86) PCT No.: PCT/CN2021/092165
§ 371 (c)(1),
(2) Date: Nov. 15, 2022

(87) PCT Pub. No.: WO2022/016959
PCT Pub. Date: Jan. 27, 2022

(65) Prior Publication Data
US 2023/0194373 A1   Jun. 22, 2023

(30) Foreign Application Priority Data
Jul. 24, 2020 (CN) .......................... 202010722104.9

(51) Int. Cl.
*G01V 1/52* (2006.01)
*E21B 47/017* (2012.01)
(Continued)

(52) U.S. Cl.
CPC .............. *G01V 1/52* (2013.01); *E21B 47/017* (2020.05); *E21B 47/14* (2013.01); *G01D 11/245* (2013.01)

(58) Field of Classification Search
CPC ......... E21B 47/017; E21B 47/14; G01V 1/52; G01D 11/24; G01D 11/245
See application file for complete search history.

(56) References Cited

U.S. PATENT DOCUMENTS 5,357,481 A * 10/1994 Lester ..................... G01V 1/523
367/75
7,364,007 B2 * 4/2008 Garcia-Osuna ......... E21B 47/01
166/255.2
(Continued)

FOREIGN PATENT DOCUMENTS

CN         2811567 Y      8/2006
CN       201714378 U      1/2011
(Continued)

OTHER PUBLICATIONS

First Office Action for Chinese Application No. 202010722104.9, dated Mar. 30, 2022, 20 Pages (including English Translation).
(Continued)

Primary Examiner — Justin N Olamit
(74) Attorney, Agent, or Firm — BROOKS KUSHMAN P.C.

(57) ABSTRACT

A sensor module, including a main body shell and a sensing device provided in the main body shell; the sensing device includes a sensor, an upper cover plate, a lower cover plate and a circuit plate; the sensor is mounted on the circuit plate; the upper cover plate and the lower cover plate are respectively mounted on the upper and lower sides of the circuit plate, and are configured to support the main body shell and fix the circuit plate; an accommodation cavity for storing an insulating fluid is provided between the upper cover plate
(Continued)

and the circuit plate, between the upper cover plate and the sensor, and between the lower cover plate and the circuit plate; and a first acoustic window is provided at a portion of the upper cover plate located above the sensor. Further disclosed are a sensor assembly and an acoustic logging tool.

18 Claims, 5 Drawing Sheets

(51) Int. Cl.
*E21B 47/14* (2006.01)
*G01D 11/24* (2006.01)

(56) References Cited

U.S. PATENT DOCUMENTS

| | | | | |
|---|---|---|---|---|
| 8,286,475 B2* | 10/2012 | Nakajima | | G01V 1/186 |
| | | | | 73/152.51 |
| 8,922,988 B2* | 12/2014 | Swett | | H05K 5/0213 |
| | | | | 361/679.36 |
| 9,709,425 B2* | 7/2017 | Matsui | | G01D 11/24 |
| 11,143,017 B2* | 10/2021 | Wang | | E21B 47/0175 |
| 2009/0218095 A1 | 9/2009 | Gordon et al. | | |

FOREIGN PATENT DOCUMENTS

| | | | |
|---|---|---|---|
| CN | 203098842 U | | 7/2013 |
| CN | 203347788 U | | 12/2013 |
| CN | 110043245 A | | 7/2019 |
| CN | 209296003 U | | 8/2019 |
| CN | 110230490 A | | 9/2019 |
| CN | 210033418 U | * | 2/2020 |
| CN | 210264664 U | | 4/2020 |
| CN | 111794735 A | | 10/2020 |
| WO | 2016144334 A1 | | 9/2016 |

OTHER PUBLICATIONS

International Search Report for Application No. PCT/CN2021/092165, dated Jul. 21, 2021, 6 Pages (including English Translation).

* cited by examiner

SENSOR MODULE, SENSOR ASSEMBLY AND ACOUSTIC LOGGING TOOL

CROSS-REFERENCE TO RELATED APPLICATIONS

This application is the U.S. national phase of PCT Application No. PCT/CN2021/092165 filed on May 7, 2021, which claims priority to Chinese Patent Application No. 202010722104.9 filed on Jul. 24, 2020, both of which are incorporated herein by reference in their entireties.

TECHNICAL FIELD

The present disclosure relates to, but is not limited to the field of logging instruments, in particular to but not limited to a sensor module, a sensor assembly and an acoustic logging instrument.

BACKGROUND

In the oil and gas industry, acquisition of accurate formation information mainly relies on downhole logging tools, and acoustic logging while drilling technology is one of the methods of the logging while drilling technology. Acoustic sensor is a core component of acoustic logging while drilling instrument, its main function is that, an acoustic sensor at a transmitting terminal sends acoustic wave with fixed frequency to a formation, an acoustic sensor at a receiving terminal receives acoustic information fed back from the formation, and finally the formation information is evaluated according to the acoustic information. Currently, commonly used acoustic sensors are piezoelectric ceramic crystals, which have a property of being fragile.

In order to prevent the acoustic sensor from being damaged during logging while drilling, a commonly used process is to encapsulate the piezoelectric ceramic crystal with damping rubber (or epoxy resin, etc.). Currently, there are three relatively mature packaging technologies for acoustic sensors: button-typed, belt-typed and strip-typed.

Among them, the strip-typed packaging method is mainly used in Sonicscope acoustic logging instrument of Schlumberger Company and some domestic scientific research institutions. The strip-typed packaging structure mainly consists of a sealing connector, a deformable shell and a sealing plug to form a sealed space, which is filled with silicone oil. A circuit bracket fixed with a circuit board is placed in the sealed space, and piezoelectric ceramics and chips are placed on the circuit board. The deformable shell is similar to a shape of a corrugated pipe, with three flat surfaces and one corrugated surface. In an environment of downhole pressure and temperature, the corrugated surface changes adaptively according to the volume of the silicone oil inside. The sealing connector may transmit the received signals and data to the inside of a drill collar. The whole structure is externally wrapped with a U-shaped rubber sleeve, and an opening of the U-shaped rubber sleeve is oriented in a same direction as the corrugated surface of the deformable shell.

SUMMARY

The following is a summary of subject matters described in detail herein. This summary is not intended to limit the protection scope of the claims.

An embodiment of the present application provides a sensor module, which includes a main body shell and a sensing device arranged in the main body shell, wherein the sensing device includes a sensor, an upper cover plate, a lower cover plate and a circuit board; the sensor is mounted on the circuit board, the upper cover plate and the lower cover plate are mounted on upper and lower sides of the circuit board respectively, and are configured to support the main body shell and fix the circuit board; an accommodation cavity for storing insulating fluid is provided between the upper cover plate and the circuit board, between the upper cover plate and the sensor, and between the lower cover plate and the circuit board; and a portion of the upper cover plate above the sensor is provided with a first acoustic window.

An embodiment of the present application further provides a sensor assembly which is configured to be mounted on a drill collar base body, the sensor assembly includes the sensor module described above, and further includes a balance module connected to a first end of the sensor module, and a data transmission module connected to a second end of the sensor module; and the balance module is configured to balance a pressure of insulating fluid inside the sensor module with a pressure of mud outside the drill collar, and the data transmission module transmits data collected by the sensor module to the drill collar.

An embodiment of the present application further provides an acoustic logging instrument, which includes a drill collar base body and further includes the sensor assembly described above, wherein an outer surface of the drill collar base body is provided with a vacancy, and the sensor assembly is mounted in the vacancy.

Other aspects may be understood upon reading and understanding of the brief description of the drawings and implementations of the embodiments of the present application.

DESCRIPTION OF REFERENCE SIGNS

Figure 1:
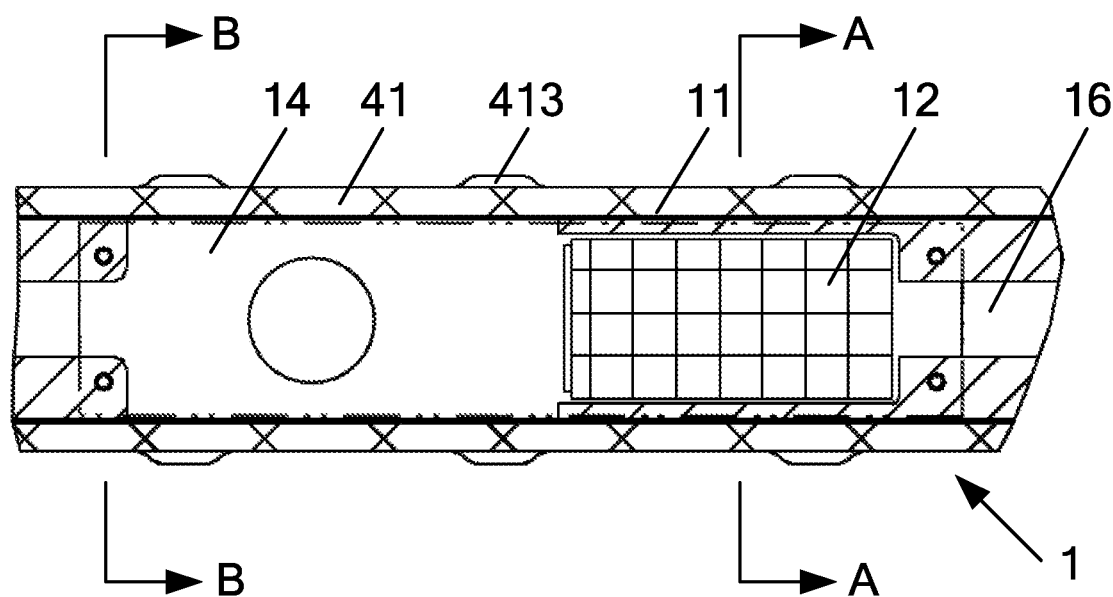
FIG. 1 is a first schematic structural diagram of a sensor module according to an embodiment of the present application.

1—sensor module, 11—main body shell, 12—sensor, 13—upper cover plate, 131—first acoustic window, 14—circuit board, 141—electric wire, 142—first screw, 143—second screw, 15—lower cover plate, 16—accommodation cavity, 17—snap, 171—upper snap plate, 172—lower snap plate, 173—wiring cavity, 18—first flange, 19—second flange, 2—balance module, 21—balance chamber body, 211—balance channel, 212—first protrusion, 213—oil filling port, 22—sealing piston, 23—elastic member, 24—mud scraper ring, 25—end lid, 26—mud passing hole, 27—oil filling plug, 28—first seal member, 3—data transmission module, 31—link joint, 32—date wire harness, 33—second seal member, 41—protective sleeve, 411—protective sleeve gap, 412—second acoustic window, 413—second protrusion, 42—protective cover, 421—third protrusion, 5—drill collar base body, 51—vacancy, 52—second groove, 53—third groove.

DETAILED DESCRIPTION

Hereinafter, embodiments of the present application will be described in detail with reference to accompanying drawings. It should be noted that, the embodiments in the present application and the features in the embodiments may be combined with each other randomly if there is no conflict.

In some cases, a sensor packaged with a strip-typed packaging structure has the following problems: a corrugated surface of a deformable shell needs to adapt to volume change of silicone oil, thus the wall thereof is required to be thin. Therefore, 3D printing and laser welding technologies are usually used in combination to manufacture the deformable shell, which requires high production technology, complex processes and high cost. Moreover, during installation, due to characteristics of the thin wall and elongated shape of the deformable shell, it is easy to cause damages of irreversible bending deformations. In addition, in an operating environment of high-temperature and high-pressure, due to limit of deformable amount of the corrugated surface, a phenomenon of overflowing of the silicon oil inside may occur.

An embodiment of the present application provides a sensor module 1, as shown in FIGS. 1 to 4, the sensor module 1 includes a main body shell 11 and a sensing device arranged in the main body shell 11. The sensing device includes a sensor 12, an upper cover plate 13, a lower cover plate 15 and a circuit board 14. The sensor 12 is mounted on the circuit board 14, the upper cover plate 13 and the lower cover plate 15 are respectively mounted on upper and lower sides of the circuit board 14, and are configured to support the main body shell 11 and fix the circuit board 14. An accommodation cavity 16 for storing insulating fluid is provided between the upper cover plate 13 and the circuit board 14, between the upper cover plate 13 and the sensor 12, and between the lower cover plate 15 and the circuit board 14, and a portion of the upper cover plate 13 above the sensor 12 is provided with a first acoustic window 131.

The sensor 12 may be used as a receiver or transmitter for acoustic signals. The sensor 12 may be fixed on the circuit board 14 by high-strength adhering. The sensor 12 may be made of piezoelectric ceramic crystals, and is configured to be square-shaped, and a thickness of the sensor 12 may be adjusted to 0.5 mm-5 mm based on requirements of sensitivity. The sensor 12 described herein further includes electronic devices associated with it, such as digital circuits and analog circuits, to implement complete functions of the sensor (measuring, recording, processing and transmitting acoustic energy signals measured by the sensor, etc.).

A sandwich structure of "upper cover plate 13+circuit board 14+lower cover plate 15" can fix and protect the circuit board 14 effectively, and serve a certain function of supporting the main body shell 11, so as to increase pressure-bearing capability of the main body shell 11. The upper cover plate 13 and the lower cover plate 15 may be mounted on the upper and lower sides of the circuit board 14 by first screws 142, respectively. It should be noted that the upper cover plate 13 and the lower cover plate 15 may be an integrally formed structure, and a chute for inserting the circuit board 14 is provided in the middle of the structure.

The arrangement of the accommodation cavity 16 can not only be used to accommodate the insulating fluid, but also ensure that the circuit board 14 is not squeezed in a case that the main body shell 11 is slightly deformed to squeeze the upper cover plate 13 and the lower cover plate 15, thus effectively ensuring the safety of the circuit board 14. There may be a gap (not shown in the figures) between the upper cover plate 13 and the circuit board 14, for example, there is a gap of 0.5 mm-2 mm (filled with insulating fluid) between the upper cover plate 13 and the circuit board 14, so as to ensure that the circuit board 14 is not squeezed and deformed while the upper cover plate 13 or the lower cover plate 15 is squeezed. A shape of the first acoustic window 131 on the upper cover plate 13 matches that of the sensor 12, for example, the first acoustic window 131 may be square to match the sensor 12 in a square shape. A windowing area of the first acoustic window 131 covers an outer surface of the sensor 12 (a surface of the sensor 12 facing the first acoustic window 131, that is, an upper surface of the sensor 12 in FIG. 2).

The upper cover plate 13 and the lower cover plate 15 may be made of materials such as polytetrafluoroethylene (PTFE), polyetheretherketone (PEEK), POLYIMIDE, etc., so as to ensure that the upper cover plate 13 and the lower cover plate 15 have certain strength and toughness, while having good insulation performance, silicone oil corrosion resistance and high temperature resistance, etc.

The main body shell 11 may be made of stainless steel, and a thickness thereof may be set to 0.2 mm-2 mm, the main body shell 11 includes an inner surface (i.e., the lower surface in FIG. 2) adjacent to the upper surface of the sensor 12, and there is a gap of 0.2-1.5 mm (filled with insulating fluid) formed between the inner surface and the upper surface of the sensor 12.

Silicone oil may be selected as the insulating fluid, and a pressure is in a range of −0.2 to 1.2 atmospheres. Alternatively, in addition to silicone oil, other fluids may be selected as the insulating fluid.

Such sandwich structure of "upper cover plate 13+circuit board 14+lower cover plate 15" is convenient for silicone oil to fill the accommodation cavity 16 and the gap between the main body shell 11 and the sensor 12, thus improving insulation performance of the sensor module 1.

Figure 2:
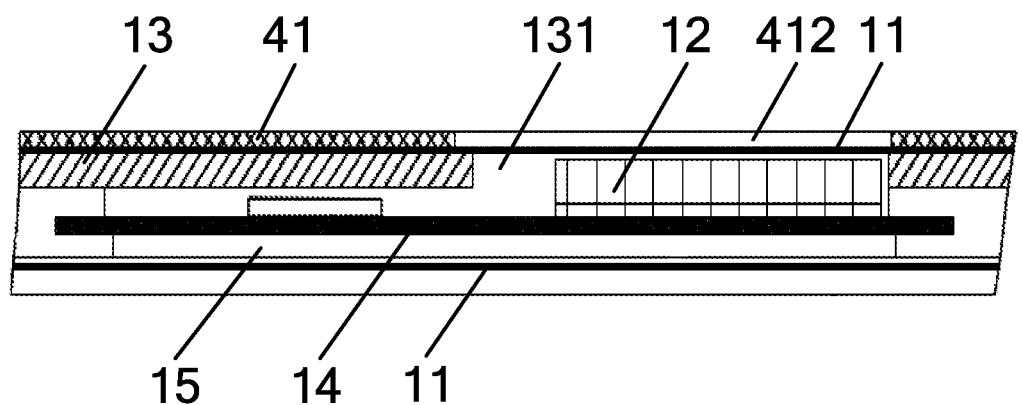
FIG. 2 is a second schematic structural diagram of a sensor module according to an embodiment of the present application.
Figure 3:
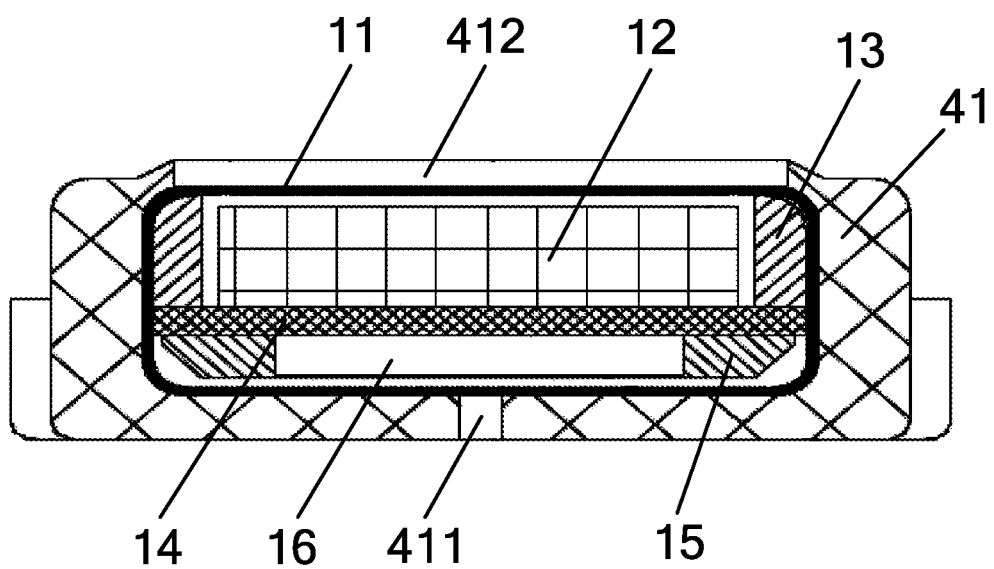
FIG. 3 is a sectional view taken along A-A in FIG. 1.
Figure 4:
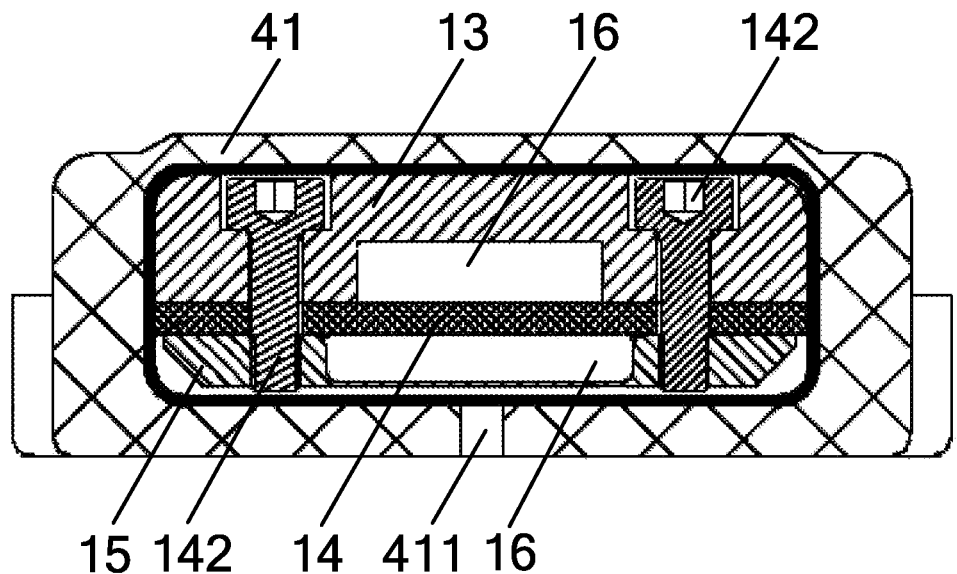
FIG. 4 is a sectional view taken along B-B in FIG. 1.

In an exemplary embodiment, as shown in FIG. 1 and FIG. 2, the main body shell 11 is elongated, and a first end of the main body shell 11 along the axial direction (i.e., a lengthwise direction of the main body shell 11, the left-right direction in FIGS. 1 and 2) is provided as an opening, a second end of the main body shell 11 along the axial direction is provided as an opening or a closed structure.

The first end of the main body shell 11 is provided as the opening for communicating with the balance module 2, which is convenient for the insulation fluid to fill the main body shell 11 (and the balance module 2), the second end of the main body shell 11 may be provided as the closed structure to seal the accommodation cavity 16, or the second end of the main body shell 11 may be provided as an opening, and the opening of the second end may be sealed by other structures (for example, the data transmission module 3), which also facilitates the connection between the main body shell 11 and other structures.

Figure 8:
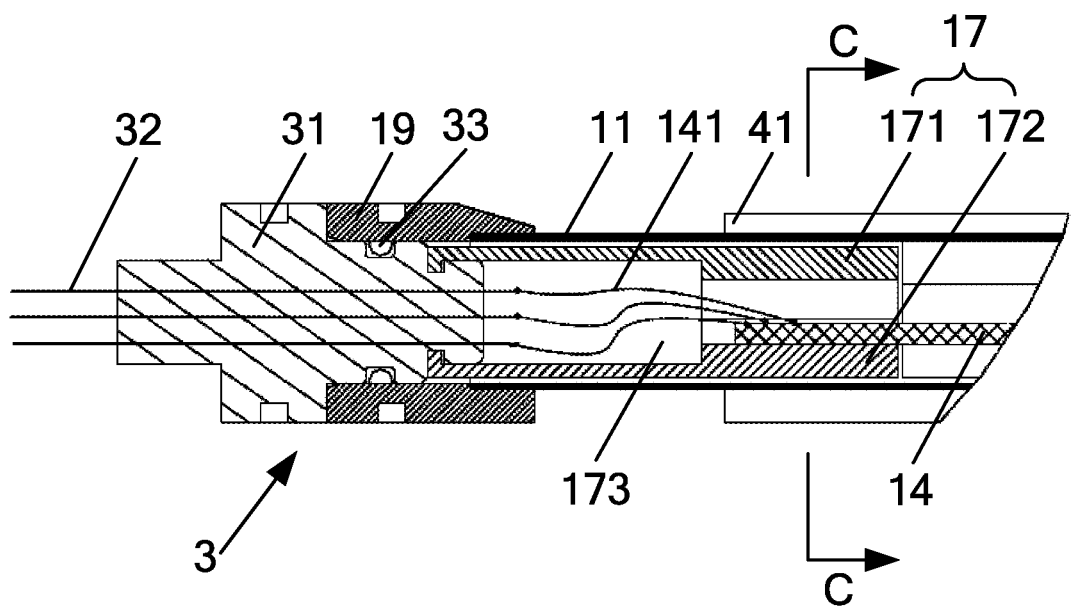
FIG. 8 is a second schematic structural diagram of a data transmission module according to an embodiment of the present application.

In an exemplary embodiment, as shown in FIG. 8, a portion of the circuit board 14 close to the second end of the main body shell 11 is configured for mounting to a snap 17 for connecting the data transmission module 3, and a wiring cavity 173 for wire connection is provided in the snap 17.

The second end of the main body shell 11 may be provided in the form of an opening, and the data transmission module 3 is arranged at the second end of the main body shell 11, a link joint 31 of the data transmission module 3 is connected and fixed to the circuit board 14 in the main body shell 11 through the snap 17. A wiring cavity 173 for wire connection is provided inside the snap 17, which is convenient for wire connection between the data transmission module 3 and the circuit board 14. The wiring cavity 173 may communicate with the accommodation cavity 16, and the interior thereof is filled with insulating fluid.

Figure 9:
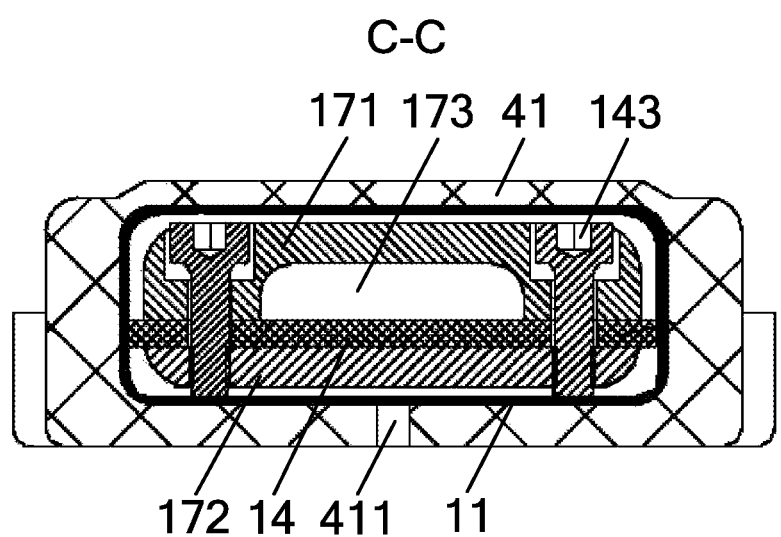
FIG. 9 is a sectional view taken along C-C in FIG. 8.
Figure 10:
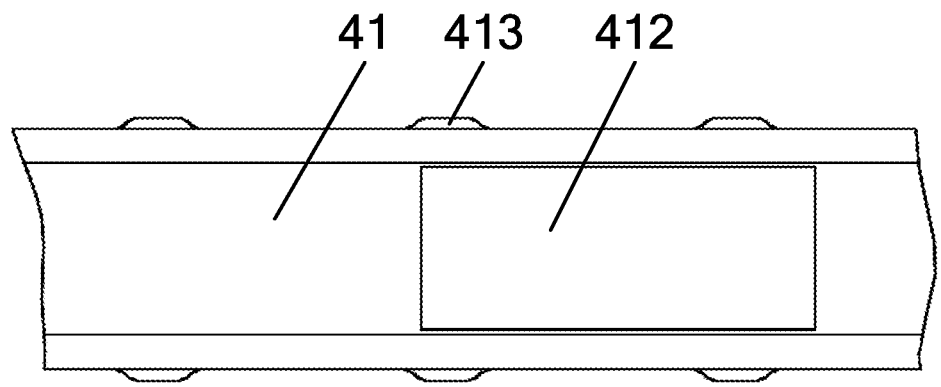
FIG. 10 is a schematic structural diagram of a protective sleeve according to an embodiment of the present application.

In an exemplary embodiment, as shown in FIGS. 8 and 9, the snap 17 includes an upper snap plate 171 and a lower snap plate 172. One end of the upper snap plate 171 and one end of the lower snap plate 172 are in snap connection with the data transmission module 3, and a fastener (second screw 143) sequentially passes through the other end of the upper snap plate 171, the circuit board 14, and the other end of the lower snap plate 172 for fixation.

The snap 17 includes the upper snap plate 171 and the lower snap plate 172, one end of the upper snap plate 171 and one end of the lower snap plate 172 are snap-fitted in a groove of the link joint 31 of the data transmission module 3, and the other end of the upper snap plate 171 and the other end of the lower snap plate 172 are fixed to the circuit board 14 by the second screw 143. Alternatively, the other end of the upper snap plate 171 and the other end of the lower snap plate 172 may be fixed to the circuit board 14 by adhering or the like, which is not limited in the present application. The upper snap plate 171 and the lower snap plate 172 may be made of materials such as high-strength stainless steel, polyetheretherketone (PEEK), etc.

In an exemplary embodiment, multiple sensing devices are provided. The multiple sensing devices are arranged with equal interval, and adjacent circuit boards 14 are connected by wires. For example, the multiple sensing devices may be arranged with equal interval along a straight line (such as an axial direction of the main body shell 11), and the spacing may be set to 101.6 mm or 152.4 mm, or the spacing may not be limited to 101.6 mm or 152.4 mm and may be determined according to other actual needs.

Multiple sensing devices may be provided to improve measurement accuracy of the sensor module 1. For example, the number of sensing devices may be 4 to 13. The number of sensing devices is not limited to 4 to 13, and may be set as required.

The sensor module 1 provided by the embodiment of the present application has high structural strength, is suitable for complex working conditions downhole, and enables the sensor assembly and the acoustic logging instrument to work stably downhole.

The sensor module 1 provided by the embodiment of the present application has good protection for the internal circuit board 14 to prevent the circuit board 14 from being extruded and deformed, and also has good support for the main body shell 11 to prevent the main body shell 11 from being deformed due to extrusion by pressure of external mud, which improve overall working reliability of the sensor module 1. In addition, the sensor module 1 provided by the embodiment of the present application has simple manufacturing process and low cost.

An embodiment of the present application further provides a sensor assembly, as shown in FIG. 5 to FIG. 10, the sensor assembly is configured to be mounted on a drill collar base body 5. The sensor assembly includes a sensor module 1, a balance module 2 connected to the first end of the sensor module 1, and a data transmission module 3 connected to the second end of the sensor module 1. The balance module 2 is configured to balance the pressure of insulating fluid inside the sensor module 1 and pressure of mud outside a drill collar (including the drill collar base body 5), and the data transmission module 3 is configured to transmit data collected by the sensor module 1 to the drill collar.

The sensor assembly provided by the embodiment of the present application is suitable for operation in a high-pressure downhole environment, the fluid pressure inside the sensor module 1 and the pressure of external mud are balanced by the balance module 2, which ensures that the main body shell 11 and other structures may not be deformed by the mud pressure, the deformation affects the normal downhole operation of the sensor module 1. With the data transmission module 3, the data collected by the sensor module 1 is transmitted to the drill collar, which is convenient for data collection and processing.

Figure 5:
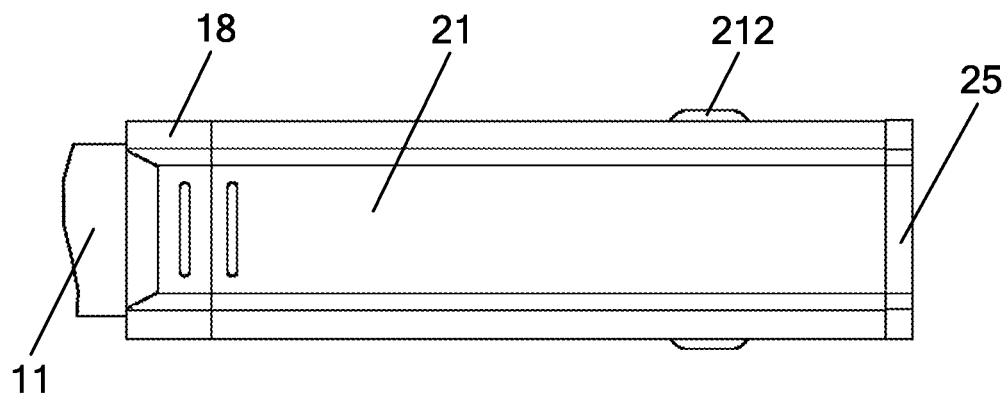
FIG. 5 is a first schematic structural diagram of a balance module according to an embodiment of the present application.
Figure 6:
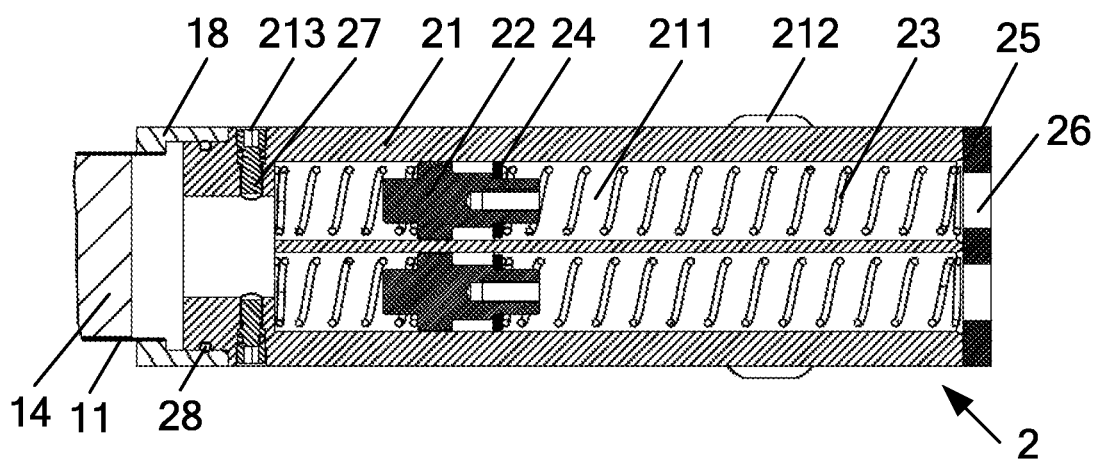
FIG. 6 is a second schematic structural diagram of a balance module according to an embodiment of the present application.

In an exemplary embodiment, as shown in FIGS. 5 and 6, the balance module 2 includes a balance chamber body 21, a sealing piston 22 and an elastic member 23. One or more balance channels 211 are provided in the balance chamber body 21. Each balance channel 211 is divided into two cavities by a sealing piston 22, one cavity (the cavity on the left side in FIG. 6) of which is communicated with the accommodation cavity 16, and the other cavity (the cavity on the right side in FIG. 6) is communicated with the outside of the drill collar. Two ends of the elastic member 23 are respectively connected to the sealing piston 22 and the balance chamber body 21, and the elastic member 23 can provide damping for sliding of the sealing piston 22 in the balance channel 211.

The balance chamber body 21 is connected to the main body shell 11 through a first flange 18. The main body shell 11 and the first flange 18 are fixed by welding, and the first flange 18 is connected and fixed to the balance chamber body 21 by screw, and a first seal member 28 (such as O-type sealing ring) is provided therebetween for sealing. The balance chamber body 21 is provided with an oil filling port 213, and silicone oil is filled into the balance chamber body 21 and the main body shell 11 through the oil filling port 213. An oil filling plug 27 is mounted in the oil filling port 213 for closing. In order to improve closing performance of the oil filling plug 27, an O-type sealing ring may further be mounted on the oil filling plug 27. The numbers of oil filling ports 213 and oil filling plugs 27 may also each be set to two or other numbers.

As shown in FIG. 6, a mud scraper ring 24 is further mounted on a side of the sealing piston 22 close to the mud. The mud scraper ring 24 is in contact with an inner wall surface of the balance channel 211, and is configured to remove the mud on the inner wall surface of the balance channel 211, thus improving the sealing performance between the sealing piston 22 and the inner wall surface of the balance channel 211.

By movement of the sealing piston 22 in the balance channel 211, the pressure of the insulating fluid is balanced with the pressure of external mud: when the pressure of the insulating fluid is greater than the pressure of external mud, the pressure difference causes the sealing piston 22 to move in the balance channel 211 toward mud (the right side in FIG. 6), thus reducing the pressure of the insulating fluid; when the pressure of the insulating fluid is less than the pressure of the external mud, the pressure difference causes the sealing piston 22 to move in the balance channel 211 toward insulating fluid (the left side in FIG. 6), thus increasing the pressure of the insulating fluid. The number of sealing pistons 22 may be set to be the same as that of the balance channels 211, that is, one sealing piston 22 is arranged in each balance channel 211.

In an exemplary embodiment, the number of elastic members 23 in one balance channel 211 is one, and the elastic member 23 is arranged at any side of the sealing piston 22, one end of the elastic member 23 is connected to the sealing piston 22, and the other end of the elastic member 23 is connected to the balance chamber body 21. Or, as shown in FIG. 6, the number of elastic members 23 in one balance channel 211 is two, and the elastic members 23 are arranged on both sides of the sealing piston 22, one end of each of the two elastic members 23 is connected to the sealing piston 22, and the other end of each elastic member 23 is connected to the balance chamber body 21.

In a case that one elastic member 23 (such as a spring) is arranged in each balance channel 211, the elastic member 23 may be arranged on the side of the sealing piston 22 close to the insulating fluid or the side of the sealing piston 22 close to the mud, one end of the elastic member 23 is connected to the sealing piston 22 and the other end of the elastic member 23 is connected to the balance chamber body 21. The elastic member 23 can cushion the movement of the sealing piston 22, and can prevent the sealing piston 22 from directly moving to a mud passing hole 26 on the balance module 2 when the insulating fluid is added into the balance module 2, which causes damage.

In a case that two elastic members 23 are arranged in each balance channel 211, the elastic members 23 may be arranged on both sides of the sealing piston 22, one end of each elastic member 23 is connected to the sealing piston 22, and the other end of each elastic member 23 is connected to the balance chamber body 21, and the two elastic members 23 may have pre-loaded compression force. The two elastic members 23 provide better cushioning effect for the movement of the sealing piston 22. Of course, when multiple balance channels 211 are arranged in the balance chamber body 21, the number of elastic members 23 in different balance channels 211 may be different or the same.

In an exemplary embodiment, a mud passing hole 26 is formed on an end face of the balance chamber body 21 away from the sensor module 1. Or, as shown in FIG. 6, the end of the balance chamber body 21 away from the sensor module 1 (the right end in FIG. 6) is further provided with an end lid 25, the end lid 25 is provided with the mud passing hole 26. The mud passing hole 26 communicates with the balance channel 211.

The external mud enters the balance channel 211 through the mud passing hole 26 and abuts against the sealing piston 22, and the sealing piston 22 can achieve dynamic balance with action of mud pressure, insulating fluid pressure, and elastic force of the elastic member 23. A sealing ring may be arranged on a contact surface between the sealing piston 22 and the balance channel 211 to improve dynamic sealing performance.

Figure 7:
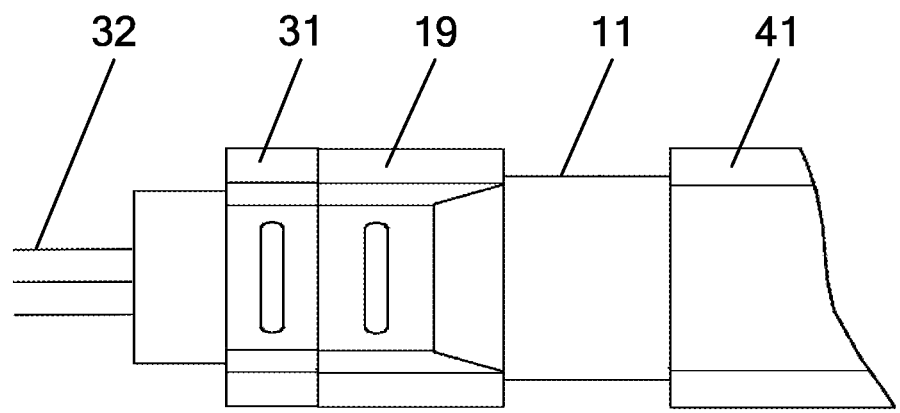
FIG. 7 is a first schematic structural diagram of a data transmission module according to an embodiment of the present application.

In an exemplary embodiment, as shown in FIGS. 7 and 8, the data transmission module 3 includes a link joint 31 which allows wires (date wire harness 32) to pass therethrough, one end of the link joint 31 is connected to the second end of the sensor module 1, one end of the date wire harness 32 is connected (electrically conducted) to an internal circuit of the drill collar, and the other end of the date wire harness 32 passes through the link joint 31 and is connected (electrically conducted) to the circuit board 14.

High-temperature sintering and sealing may be used between the date wire harness 32 and the link joint 31 to ensure the sealing and pressure-bearing performance. One end of the date wire harness 32 is connected to the internal circuit of the drill collar, and the other end of the date wire harness 32 passes through the link joint 31 and is connected to the circuit board 14. The other end of the date wire harness 32 passing through the link joint 31 may be provided with solder cups to facilitate connection with wires 141 led out from the circuit board 14.

In an exemplary embodiment, as shown in FIGS. 7 and 8, the data transmission module 3 is connected to the sensor module 1 through a flange (such as a second flange 19), the second flange 19 is fixed with the main body shell 11 by welding, and a second seal member (such as an O-type sealing ring) 33 is arranged between the second flange 19 and the link joint 31.

The second flange 19 and the main body shell 11 are fixed by welding to improve the connection strength and sealing performance therebetween. A second seal member 33 is arranged between the second flange 19 and the link joint 31 to improve the sealing performance therebetween, and the second flange 19 and the link joint 31 are connected conveniently.

The link joint 31 is connected to the main body shell 11 by the second flange 19. The main body shell 11 and the second flange 19 are fixed by welding, and the second flange 19 and the link joint 31 are connected and fixed by screw, and an O-type sealing ring is provided therebetween for sealing.

In an exemplary embodiment, as shown in FIG. 2, and FIG. 7 to FIG. 10, the sensor assembly further includes a protective sleeve 41 sleeved outside the main body shell 11, and a second acoustic window 412 is arranged at a portion of the protective sleeve 41 above the first acoustic window 131. A shape of the second acoustic window 412 on the protective sleeve 41 matches that of the sensor 12, for example, the second acoustic window 412 may be square to match the sensor 12 in a square shape. A windowing area of the second acoustic window 412 covers an outer surface of the sensor 12 (a surface of the sensor 12 facing the second acoustic window 412, that is, the upper surface of the sensor 12 in FIG. 2). Arrangement of the first acoustic window 131 and the second acoustic window 412 can effectively improve signal acquisition efficiency of the sensor 12.

As shown in FIG. 9, the bottom of the protective sleeve 41 is provided with a protective sleeve gap 411, which is convenient for the protective sleeve 41 to be assembled outside the main body shell 11, and besides, enables the protective sleeve 41 to have a certain deformation space. The protective sleeve 41 may be made of rubber (e.g., fluororubber or hydrogenated nitrile rubber) with a hardness (Shore hardness) of 70-95. The protective sleeve 41 can play a good role in shock absorption and protection of the main body shell 11 and its internal components, release a coupling effect between drill collar waves and the sensor, and eliminate interference of the drill collar waves to the sensor.

The sensor assembly provided by the embodiment of the present application has good downhole pressure balance capability, and can still work reliably even when it is located in a high-pressure downhole environment. In addition, the balance module 2 of the sensor assembly replaces the corrugated pipe structure used in some technologies, which greatly simplifies the structure of the sensor assembly and further improves the working reliability of the sensor assembly downhole.

Figure 11:
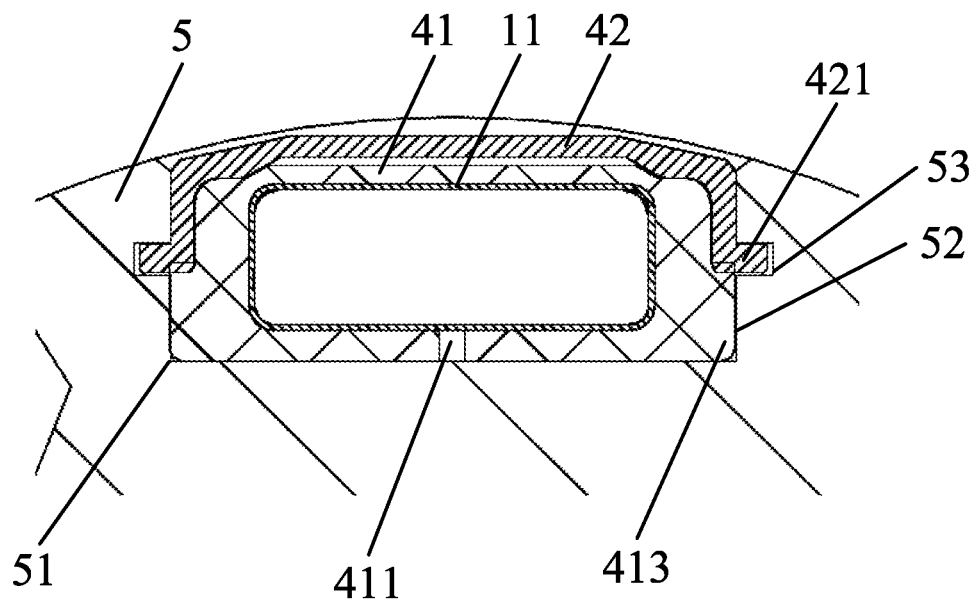
FIG. 11 is a schematic structural diagram of an acoustic logging instrument according to an embodiment of the present application.

An embodiment of the present application further provides an acoustic logging instrument, as shown in FIG. 11, the acoustic logging instrument includes a drill collar base body 5 and further includes a sensor assembly, an outer surface of the drill collar base body 5 is provided with a vacancy 51, and the sensor assembly is mounted in the vacancy 51.

The acoustic logging instrument includes the aforementioned sensor assembly, and the vacancy (groove body) 51 on the drill collar base body 5 can well fix and protect the sensor assembly, so that the acoustic logging instrument can complete a series of logging work downhole, which is safe and reliable.

In an exemplary embodiment, two sides of the vacancy 51 are each provided with a first groove (not shown in the figures) and a second groove 52, two side surfaces of the balance chamber body 21 are each provided with a first protrusion 212 (see FIGS. 5 and 6), and two side surfaces of the protective sleeve 41 are each provided with a second protrusion 413 (see FIG. 10), the first protrusions 212 and the second protrusions 413 are respectively clamped into the first grooves and the second grooves 52, to limit movement of the sensor assembly along an axial direction of the drill collar base body 5.

The vacancy 51 limits the sensor assembly in a circumferential direction, and the first groove and the second groove 52 limit the sensor assembly axially, prevent the sensor assembly from moving axially along the drill collar base body 5, thus ensuring that the acoustic logging instrument can work safely and reliably downhole.

In an exemplary embodiment, the acoustic logging instrument further includes a protective cover 42, the protective cover 42 is mounted outside the protective sleeve 41, two sides of the vacancy 51 are further provided with third grooves 53, third protrusions 421 are provided on two side surfaces of the protective cover 42, and the third protrusions 421 are clamped into the third grooves 53 to limit the radial movement of the sensor assembly along the drill collar base body 5.

The third grooves 53 limits the sensor assembly radially, limit the radial movement of the sensor assembly along the drill collar base body 5, prevent the sensor assembly from falling out of the vacancy 51 radially, and besides, can avoid the problem of falling of screws during operation, as well as occurrence of operation accidents, and ensure that the acoustic logging instrument can work safely and reliably downhole.

As shown in FIG. 11, a gap of 1 mm-5 mm may be provided between an end face of the protective cover 42 and the protective sleeve 41 (a gap between a lower end face of the protective cover 42 and an upper end face of the protective sleeve 41 in FIG. 11) to facilitate penetration of formation sound waves. A thickness of the protective cover 42 may be set to 1 mm to 4 mm, and a material of the protective cover 42 may be stainless steel or PEEK, etc. The protective cover 42 has acoustic transmission performance while providing further protection for the sensor assembly.

Forms of the first protrusions 212, the second protrusions 413 and the third protrusions 421 may be selected according to actual situations, such as trapezoid, circle, arc, etc., which are not limited in the present application.

The sensor module, the sensor assembly and the acoustic logging instrument provided by the embodiments of the present application have simple manufacturing processes and low costs, and the sensor module is matched with a piston-type balance chamber structure to form pressure balance between internal silicone oil and external mud. The balance structure in the balance module, compared with the corrugated pipe structure of the deformable shell, can better adapt to the volume change of the silicone oil, prevent the silicone oil from overflowing in extreme operating environments, and greatly improve the reliability of downhole work of logging instruments.

In the description of the present application, it should be noted that the orientation or positional relationships indicated by the terms such as "upper", "lower", "left", "right" are based on the orientation or positional relationships shown in the drawings, which are only for convenience of describing the present application and simplifying the description, rather than indicating or implying that the structure referred has the specific orientation, or is constructed and operated in the specific orientation, and thus cannot be interpreted as a limitation on the present application.

In the description of the embodiments of the present application, unless otherwise explicitly specified and limited, the terms "connection" and "connection with" should be understood in a broad sense. For example, the term "connection" may be a fixed connection, a detachable connection or an integrated connection; may be a direct connection, or an indirect connection through an intermediary, or may be an internal communication between two elements. For those of ordinary skills in the art, the specific meanings of the above terms in the present application can be understood according to specific situations.

The present application describes embodiments which are exemplary but not restrictive, and it is apparent to those of ordinary skills in the art that there may be more embodiments and implementation schemes within the scope covered by the embodiments described in the present application. Although many possible combinations of features are shown in the drawings and discussed in the detailed implementations, many other combinations of disclosed features are possible. Unless specifically limited, any feature or element of any embodiment may be used in combination with any other feature or element of any other embodiment or may replace any other feature or element of any other embodiment.

The present application includes and contemplates combinations with features and elements known to those of ordinary skills in the art. The disclosed embodiments, features and elements of the present application may also be combined with any conventional features or elements to form a unique technical scheme defined by the claims. Any feature or element of any embodiment may also be combined with feature(s) or element(s) from another technical scheme to form another unique technical scheme defined by the claims. Therefore, it should be understood that any features shown and/or discussed in the present application may be realized individually or in any suitable combination. Therefore, the embodiments are not to be limited except by those made according to the appended claims and their equivalents. Furthermore, various modifications and changes may be made within the protection scope of the appended claims.

What is claimed is:

1. A sensor assembly configured to be mounted on a drill collar base body, comprising:
 sensor module comprising a main body shell and a sensing device arranged in the main body shell, wherein the sensing device comprises a sensor, an upper cover plate, a lower cover plate and a circuit board, the sensor is mounted on the circuit board, the upper cover plate and the lower cover plate are mounted on upper and lower sides of the circuit board respectively, and are configured to support the main body shell and fix the circuit board, an accommodation cavity configured to store insulating fluid is provided between the upper cover plate and the circuit board, between the upper cover plate and the sensor, and between the lower cover plate and the circuit board, and a portion of the upper cover plate above the sensor is provided with a first acoustic window; and a balance module comprising a balance chamber body, a sealing piston, and an elastic member, wherein a first end of the main body shell along an axial direction is provided as an opening for communicating with a balance module, more than one balance channels are arranged in the balance chamber body, and each balance channel is divided into two cavities by the sealing piston, wherein one of the cavities is communicated with the accommodation cavity, and the other of the cavities is communicated with outside of a drill collar, and two ends of the elastic member are respectively connected to the sealing piston and the balance chamber body, and the elastic member is configured to be capable of providing damping for sliding of the sealing piston in the balance channel;

wherein the sensor module further comprises a protective sleeve sleeved outside the main body shell, two side surfaces of the balance chamber body are each provided with a first protrusion, and two side surfaces of the protective sleeve are each provided with a second protrusion, the first protrusion and the second protrusion are configured to be clamped into a first groove and a second groove on two sides of a vacancy which is provided on an outer surface of a drill collar base body.

2. The sensor assembly according to claim 1, wherein the main body shell is elongated, and a second end of the main body shell along the axial direction is provided as an opening or a closed structure.

3. The sensor assembly according to claim 2, wherein a portion of the circuit board close to the second end of the main body shell is configured to be mounted to a snap for connecting a data transmission module, a wiring cavity for connecting wires is arranged in the snap.

4. The sensor assembly according to claim 3, wherein the snap comprises an upper snap plate and a lower snap plate, one end of the upper snap plate and one end of the lower snap plate are configured to be in snap connection with the data transmission module, and a fastener sequentially passes through another end of the upper snap plate, the circuit board, and another end of the lower snap plate for fixation.

5. The sensor assembly according to claim 4, wherein a plurality of sensing devices are provided, and the plurality of sensing devices are arranged with equal interval, and adjacent circuit boards are connected by wires.

6. The sensor assembly according to claim 3, wherein a plurality of sensing devices are provided, and the plurality of sensing devices are arranged with equal interval, and adjacent circuit boards are connected by wires.

7. The sensor assembly according to claim 2, wherein a plurality of sensing devices are provided, and the plurality of sensing devices are arranged with equal interval, and adjacent circuit boards are connected by wires.

8. The sensor assembly according to claim 1, wherein a plurality of sensing devices are provided, and the plurality of sensing devices are arranged with equal interval, and adjacent circuit boards are connected by wires.

9. A sensor assembly configured to be mounted on a drill collar base body, comprising the sensor module according to claim 1, wherein the balance module is connected to a first end of the sensor module, and the sensor assembly further comprises a data transmission module connected to a second end of the sensor module, wherein the balance module is configured to balance a pressure of insulating fluid inside the sensor module with a pressure of mud outside a drill collar, and the data transmission module is configured to transmit data collected by the sensor module to the drill collar.

10. The sensor assembly according to claim 9, wherein the number of elastic member in a balance channel is one, and the elastic member is arranged at any side of the sealing piston, one end of the elastic member is connected to the sealing piston, and the other end of the elastic member is connected to the balance chamber body; or the number of elastic members in a balance channel is two, and the two elastic members are arranged on two sides of the sealing piston, one end of each elastic member is connected to the sealing piston, and the other end of each elastic member is connected to the balance chamber body.

11. The sensor assembly according to claim 9, wherein a mud passing hole is formed on an end face of the balance chamber body away from the sensor module, and the mud passing hole is communicated with the balance channel; or an end lid is further mounted at an end of the balance chamber body away from the sensor module, and the end lid is provided with a mud passing hole which is communicated with the balance channel.

12. The sensor assembly according to claim 9, wherein the data transmission module comprises a link joint which allows a wire to pass therethrough, one end of the link joint is connected to the second end of the sensor module, and one end of the wire is configured to be connected to an internal circuit of the drill collar, and the other end of the wire passes through the link joint and is connected to the circuit board.

13. The sensor assembly according to claim 12, wherein the data transmission module is connected to the sensor module through a flange, the flange and the main body shell are fixed by welding, and a sealing ring is arranged between the flange and the link joint.

14. The sensor assembly according to claim 9, wherein a second acoustic window is arranged at a portion of the protective sleeve above the first acoustic window.

15. An acoustic logging instrument, comprising the drill collar base body, and further comprising the sensor assembly according to claim 9, wherein the outer surface of the drill collar base body is provided with the vacancy, and the sensor assembly is mounted in the vacancy.

16. The acoustic logging instrument according to claim 15, wherein a second acoustic window is arranged at a portion of the protective sleeve above the first acoustic window, two sides of the vacancy are each provided with the first groove and the second groove, the first protrusions and the second protrusions are respectively clamped into the first grooves and the second grooves, to limit movement of the sensor assembly along an axial direction of the drill collar base body.

17. The acoustic logging instrument according to claim 16, further comprising a protective cover, wherein the protective cover is mounted outside the protective sleeve, two sides of the vacancy are further provided with third grooves, third protrusions are provided on two side surfaces of the protective cover, and the third protrusions are clamped into the third grooves to limit movement of the sensor assembly along a radial direction of the drill collar base body.

18. The sensor assembly according to claim 10, wherein the data transmission module comprises a link joint which allows a wire to pass therethrough, one end of the link joint is connected to the second end of the sensor module, and one end of the wire is configured to be connected to an internal circuit of the drill collar, and the other end of the wire passes through the link joint and is connected to the circuit board.

* * * * *